(12) United States Patent
Darrow, Jr. et al.

(10) Patent No.: US 10,112,708 B2
(45) Date of Patent: Oct. 30, 2018

(54) WEIGHT EFFICIENT SERVO ATTACHMENT SCHEME FOR RIGID COAXIAL ROTOR CONTROL SYSTEM

(71) Applicant: Sikorsky Aircraft Corporation, Stratford, CT (US)

(72) Inventors: David A. Darrow, Jr., Stratford, CT (US); Stephen V. Poulin, Milford, CT (US); Bryan D. Mayrides, Derby, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 186 days.

(21) Appl. No.: 14/915,151

(22) PCT Filed: Aug. 7, 2014

(86) PCT No.: PCT/US2014/050088
§ 371 (c)(1),
(2) Date: Feb. 26, 2016

(87) PCT Pub. No.: WO2015/069343
PCT Pub. Date: May 14, 2015

(65) Prior Publication Data
US 2016/0200432 A1    Jul. 14, 2016

Related U.S. Application Data

(60) Provisional application No. 61/871,129, filed on Aug. 28, 2013, provisional application No. 61/871,199, filed on Aug. 28, 2013.

(51) Int. Cl.
*B64C 27/00* (2006.01)
*B64C 27/32* (2006.01)
(Continued)

(52) U.S. Cl.
CPC ............ *B64C 27/32* (2013.01); *B64C 27/001* (2013.01); *B64C 27/10* (2013.01); *B64C 27/605* (2013.01);
(Continued)

(58) Field of Classification Search
CPC .............................. B64C 27/10; B64C 27/625
See application file for complete search history.

(56) References Cited

U.S. PATENT DOCUMENTS 1,906,143 A * 4/1933 Evans ..................... B64C 27/10
 244/109
3,322,200 A 5/1967 Tresch
(Continued)

FOREIGN PATENT DOCUMENTS

EP        1944234 A1    7/2008

OTHER PUBLICATIONS

ElectroDynamics, [online]; [retrieved on Oct. 29, 2013]; retrieved from the Internethttp://electrodynam.com/rc/EDR-111/ ElectroDynamics, "Electronics and More for the Discerning Modelerl," 2013, Oct. 29, 2013, pp. 1-3.
(Continued)

*Primary Examiner* — Jessica B Wong
(74) *Attorney, Agent, or Firm* — Cantor Colburn LLP

(57) ABSTRACT

A mounting assembly for connecting a first surface to a second surface and for holding a first servo which moves an adjacent first component is provided including a leg. A first end of the leg is attachable to the first surface and a second end of the leg is attachable to the second surface. The leg is generally bent such that the first end of each leg is arranged at an angle to the second end of each leg so as to transmit forces between the first and second surface. A bracket connected to the leg includes a notch configured to receive the first servo. When the first servo is positioned within the
(Continued)

first notch, a free end of the first servo is operably coupled to the adjacent first component and the leg reacts forces generated by the first servo into the first and second surfaces.

11 Claims, 5 Drawing Sheets

(51) Int. Cl.
*B64C 27/10* (2006.01)
*B64C 27/605* (2006.01)

(52) U.S. Cl.
CPC .. *B64C 2027/002* (2013.01); *B64C 2027/004* (2013.01)

(56) References Cited

U.S. PATENT DOCUMENTS

| | | | | |
|---|---|---|---|---|
| 3,448,810 | A * | 6/1969 | Vogt | B64C 27/605 |
| | | | | 416/127 |
| 3,574,483 | A * | 4/1971 | Linden | B64C 27/54 |
| | | | | 416/108 |
| 5,209,429 | A | 5/1993 | Doolin et al. | |
| 5,624,232 | A | 4/1997 | Certain | |
| 6,231,005 | B1 | 5/2001 | Costes | |
| 6,280,141 | B1 | 8/2001 | Rampal et al. | |
| 7,118,328 | B2 | 10/2006 | Welsh et al. | |
| 2012/0263445 | A1 * | 10/2012 | Beasley | G03B 15/006 |
| | | | | 396/12 |
| 2013/0099080 | A1 | 4/2013 | Baines | |

OTHER PUBLICATIONS

EP Communication; Extended European Search Report; Application No. 14860807.8-1754 / 3038905 PCT/US2014050088; dated Aug. 10, 2017, pp. 1-9.
HeliFreak.com, [online]; [retrieved on Oct. 29, 2013]; retrieved from the Internethttp://www.helifreak.com/showthread.php?t=258274Helifreak.com, Digital Servos & BEC,2009, Oct. 29, 2013, pp. 1-10.
Leonard E. Smollen, "Active Vibration Isolation of Helicopter Rotors", Journal of the American Helicopter Society, AHS International, vol. 7, No. 2, pp. 45-55, Apr. 1, 1962. Abstract Only.
PCT Invitation to Pay Additional Fees and, where applicable, protest Fee, International Application No. PCT/US14/50088; International Filing Date: Aug. 7, 2014, dated Apr. 10, 2015, pp. 1-2.
PCT IPRP; International Application No. PCT/US2014/050088; International Filing Date: Aug. 7, 2014, dated Mar. 1, 2016, pp. 1-9.
Rockwell Automation, "Servo Drive Installation Best Practices", Rockwell Automation Publication Motion-AT004A-EN-P, Oct. 2011, pp. 1-32.
Sikorsky.com, "Black Hawk Helicopter Backgrounder", downloaded from http://ww1.sikorsky.com/sikorskypresskit/CompanyInfo/Backgrounders/BLACKHAINK_helicopter_FINAL_062310.pdf on Oct. 29, 2013, pp. 1-4.
International Search Report, International Application No. PCT/US2014/050088, dated Jun. 24, 2014, pp. 1-11.
Written Opinion of the International Searching Authority, International Application No. PCT/US2014/050088, dated Jun. 24, 2014, pp. 1-8.

* cited by examiner

WEIGHT EFFICIENT SERVO ATTACHMENT SCHEME FOR RIGID COAXIAL ROTOR CONTROL SYSTEM

CROSS-REFERENCE TO RELATED APPLICATIONS

This application claims the benefit of U.S. provisional patent application Ser. No. 61/871,129 filed Aug. 28, 2013 and U.S. provisional patent application Ser. No. 61/871,199 filed Aug. 28, 2013, the entire contents of which are incorporated herein by reference.

STATEMENT REGARDING FEDERALLY SPONSORED RESEARCH OR DEVELOPMENT

This invention was made with Government support under Technology Investment Agreement No. W911W6-11-2-0007 with the Department of the United States Army. The Government has certain rights in the invention

BACKGROUND OF THE INVENTION

Exemplary embodiments of the invention relate to a rotary wing aircraft, and more particularly, to a mounting assembly of the main rotor system of the rotary wing aircraft.

The main rotor assembly of a helicopter develops large magnitude dynamic and static longitudinal, lateral, vertical, and torsional loads. Known helicopter design methodology utilizes a support structure to integrate elements of the main rotor assembly, such as the rotor mast and the engine transmission within the helicopter airframe. Such support structures also provide main rotor servo attachment lugs which provide lower attachment points for the rotor servo actuators which are operable to articulate a main rotor swash plate.

As the support structure and particularly the attachment lugs must resist large magnitude loads, known support structures are commonly manufactured of rigid metallic materials, such as titanium. This metal support structure is costly and adds weight to the aircraft.

As with other aerospace components, there is a desire to reduce the cost and weight and complexity of the support structure and main rotor servo attachment lugs. Accordingly, it is desirable to provide a support structure which is lightweight, inexpensive, relatively simple to manufacture, and easily secured to the helicopter main rotor system and airframe. It is also desirable to provide a structure for supporting the main rotor servos that is integral to the support structure and resistant to large magnitude axial and transverse loads.

BRIEF DESCRIPTION OF THE INVENTION

According to one embodiment of the invention, a mounting assembly for connecting a first surface to a second surface and for holding a first servo which moves an adjacent first component is provided including a leg. A first end of the leg is attachable to the first surface and a second end of the leg is attachable to the second surface. The leg is generally bent such that the first end of each leg is arranged at an angle to the second end of each leg so as to transmit forces between the first and second surface. A bracket connected to the leg includes a notch configured to receive the first servo. When the first servo is positioned within the first notch, a free end of the first servo is operably coupled to the adjacent first component and the leg reacts forces generated by the first servo into the first and second surfaces.

In addition to one or more of the features described above, or as an alternative, in further embodiments the first end of the leg is shaped to be coupled to a cylindrical sleeve arranged about a rotating shaft In addition to one or more of the features described above, or as an alternative, in further embodiments including additional legs, wherein the leg and the additional legs are spaced equidistantly about the cylindrical sleeve.

In addition to one or more of the features described above, or as an alternative, in further embodiments the second end of the leg is configured to couple to an airframe of a rotary wing aircraft.

In addition to one or more of the features described above, or as an alternative, in further embodiments each bracket further comprises a second notch configured to receive a second servo.

In addition to one or more of the features described above, or as an alternative, in further embodiments when the second servo is positioned within the second notch, a free end of the second servo is operably coupled to an adjacent second component.

In addition to one or more of the features described above, or as an alternative, in further embodiments the adjacent first component comprises a first stationary swashplate, and the free end of the first servo is operably coupled to the first stationary swashplate and the adjacent second component comprises a second stationary swashplate, and the free end of the second servo is operably coupled to the second stationary swashplate.

According to another embodiment of the invention, a mounting assembly for connecting a first surface to a second surface and for holding a first servo which moves an adjacent first component is provided including a leg. A first end of the leg is attachable to the first surface and a second end of the leg is attachable to the second surface. The leg is generally bent such that the first end of each leg is arranged at an angle to the second end of each leg so as to transmit forces between the first and second surface. A rib extends from the leg near the second end thereof. The rib is configured to connect to and support a portion of an active vibration control system.

In addition to one or more of the features described above, or as an alternative, in further embodiments the portion of the active vibration control system includes at least one force generator.

In addition to one or more of the features described above, or as an alternative, in further embodiments the rib is integrally formed with the leg.

According to another embodiment of the invention, a rotary wing aircraft is provided including an airframe and a main rotor system configured to rotate about a first axis of rotation. A first stationary swashplate is operably coupled to at least one first blade of the main rotor system. A mounting assembly is configured to transfer loads from the main rotor system to the airframe. The mounting assembly includes a first leg having a first end and a second end. The first end of the first leg is coupled to the main rotor system and the second end of the first leg is connected to the airframe. A bracket integrally formed with the first leg includes a first notch configured to receive a first servo. A free end of the first servo is operably coupled to the first stationary swashplate.

In addition to one or more of the features described above, or as an alternative, in further embodiments operation of the first servo adjusts a pitch of the at least one first blade via the first stationary swashplate.

In addition to one or more of the features described above, or as an alternative, in further embodiments a second stationary swashplate is operably coupled to at least one second blade of the main rotor system. The bracket further comprises a second notch configured to receive a second servo such that a free end of the second servo is operably coupled to the second stationary swashplate. Operation of the second servo adjusts a pitch of the at least one second blade via the second stationary swashplate.

In addition to one or more of the features described above, or as an alternative, in further embodiments a portion of an active vibration control system is mounted to the first leg of the mounting assembly.

In addition to one or more of the features described above, or as an alternative, in further embodiments the portion of the active vibration control system includes at least one force generator mounted to the leg.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
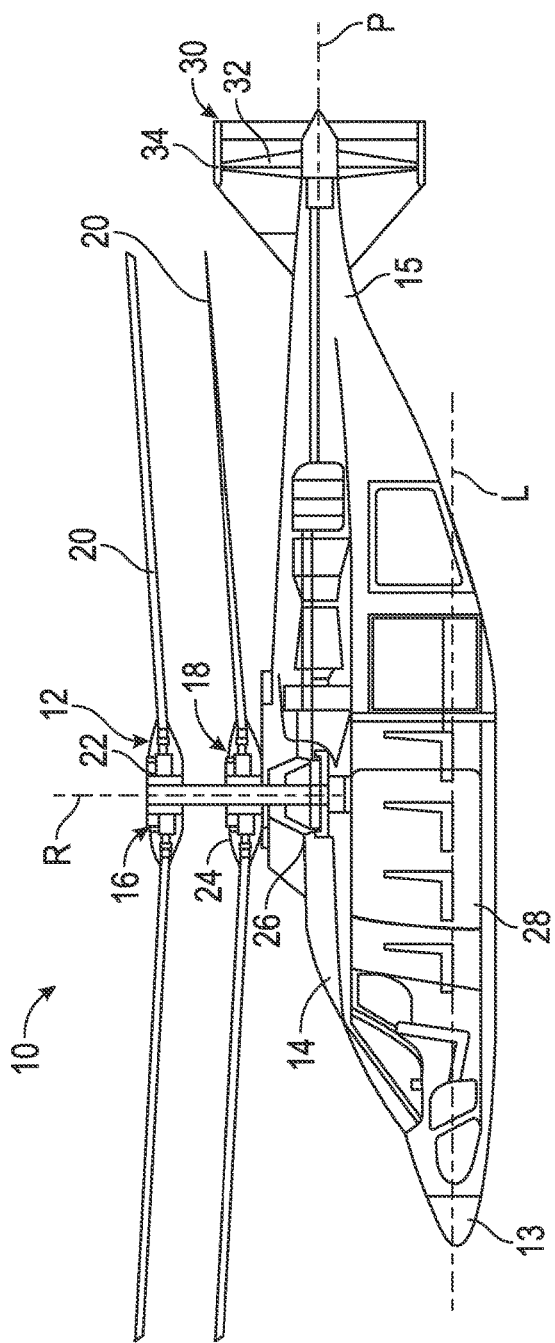
FIGS. 1A-1B are general views of an example of a rotary wing aircraft.
Figure 1B:
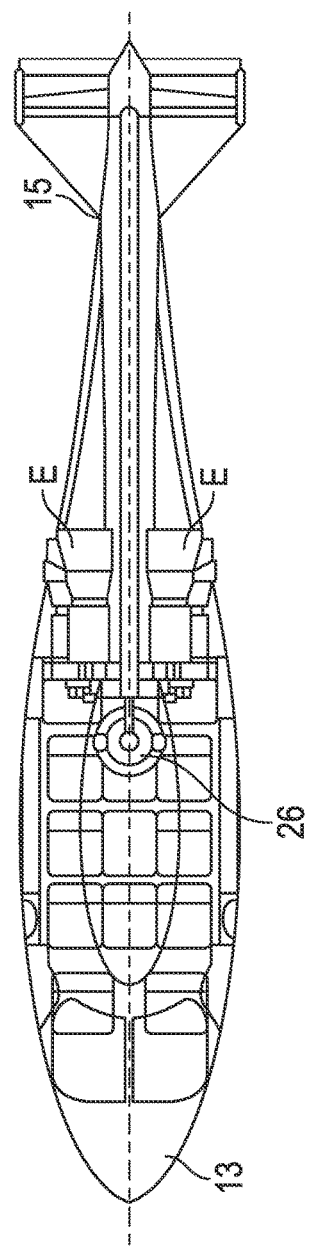

FIGS. 1A and 1B illustrate an exemplary vertical takeoff and landing (VTOL) rotary-wing aircraft 10 having a dual contra-rotating, coaxial main rotor system 12, which rotates about an axis of rotation A. The aircraft 10 includes an airframe 14 which supports the dual, contra-rotating, coaxial main rotor system 12, as well as a translational thrust system 30, which provides translational thrust generally parallel to an aircraft longitudinal axis L. Although a particular aircraft configuration is illustrated in the disclosed embodiment, other counter-rotating, coaxial rotor systems as well as non-coaxial rotor systems will also benefit from the present invention.

The main rotor system 12 includes a first rotor system 16 and a second rotor system 18, and each rotor system 16, 18 includes a multiple of rotor blades 20 mounted to a rotor hub 22, 24. The main rotor system 12 is driven by a main gearbox 26. The translational thrust system 30 may be any propeller system including, but not limited to a pusher propeller, a tractor propeller, a nacelle mounted propeller, etc. In one embodiment, the translational thrust system 30 includes a pusher propeller system 32 as illustrated with a propeller rotational axis P oriented substantially horizontal and parallel to the aircraft longitudinal axis L to provide thrust for high speed flight. The translational thrust system 30 may alternatively or additionally include side mounted thrusters, forward mounted thrusters, or other prop or jet powered systems separate from the main rotor system 12. The illustrated embodiment mounted the propeller system 32 with an aerodynamic cowling 34 at the rear of the airframe 14. The translational thrust system 30 is preferably driven through the main gearbox 26 which drives the rotor 12.

The main gearbox 26 is driven by one or more engines E (two shown). In the case of a rotary wing aircraft, the gearbox 26 is interposed between one or more gas turbine engines, the rotor system 12, and the translational thrust system 30. The main gearbox 26 may be a split torque gearbox which carries torque from the engines E through a multitude of drive train paths.

Figure 2:
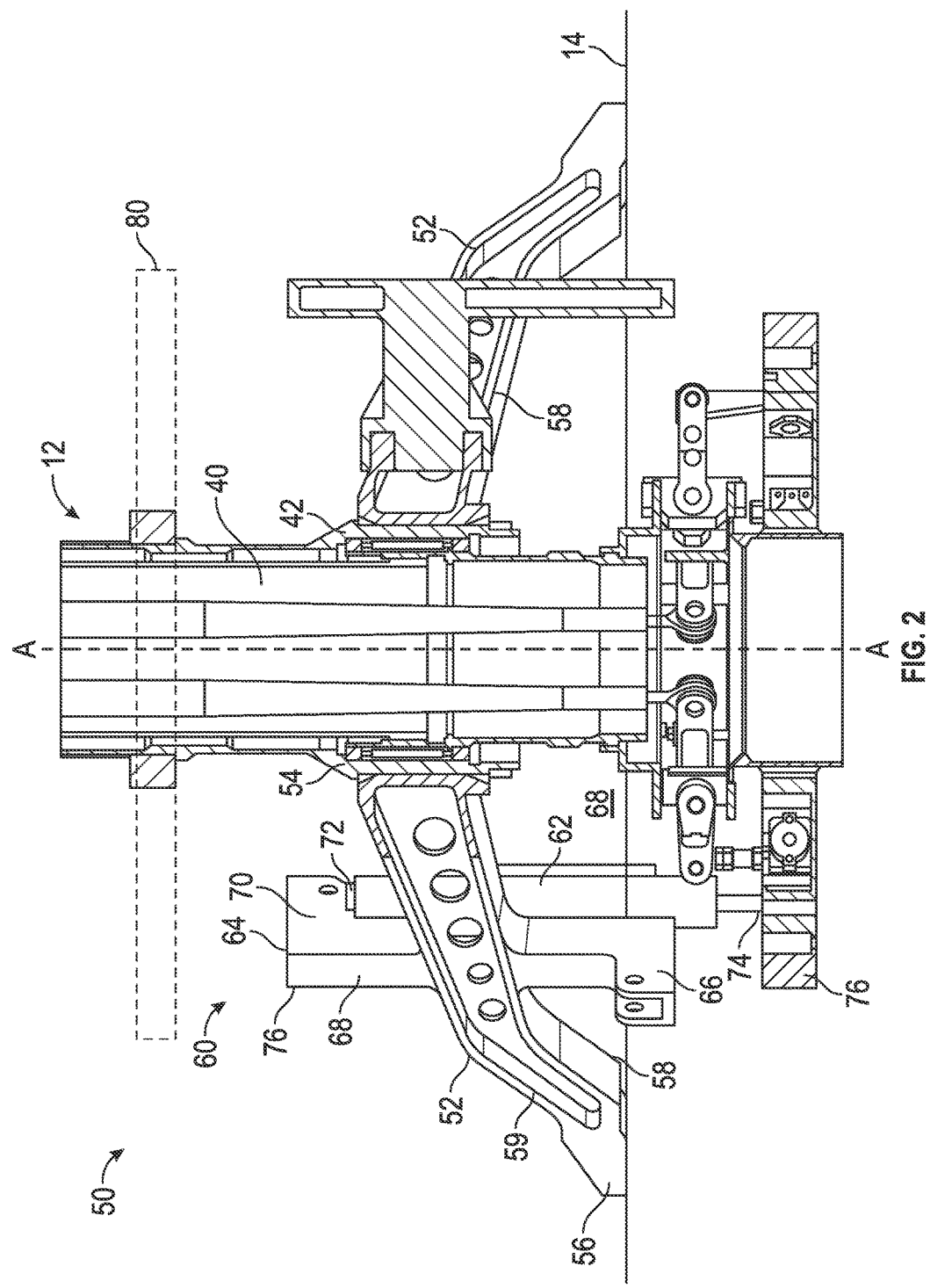
FIG. 2 is a side perspective view of a mounting assembly according to an embodiment of the invention.
Figure 3:
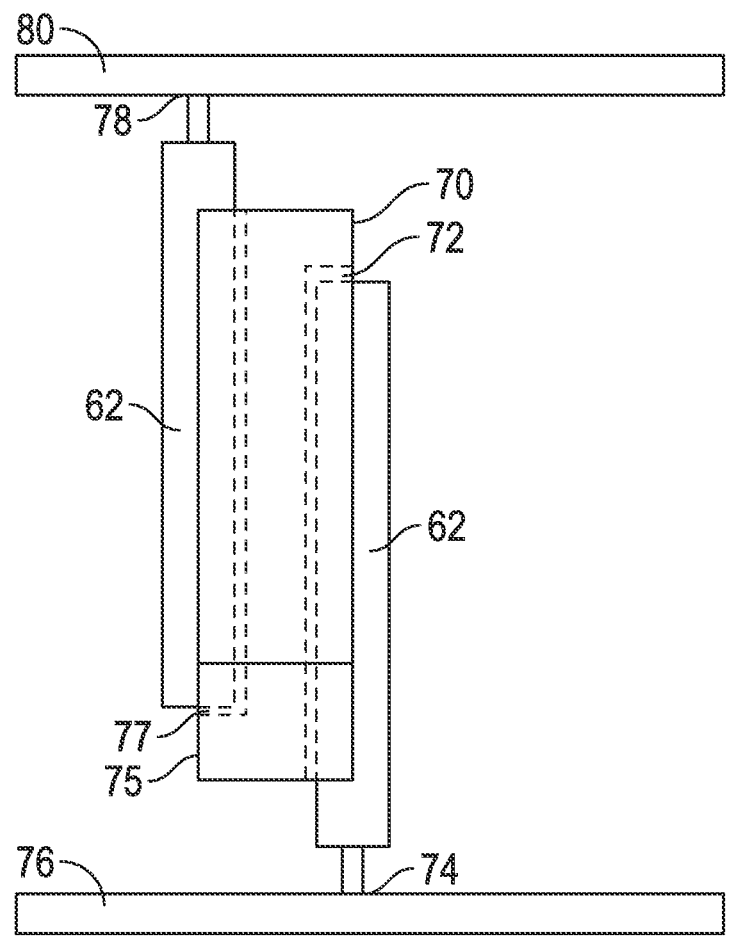
FIG. 3 is a front view of a bracket of a mounting assembly according to an embodiment of the invention.

Referring now to FIGS. 2 and 3, a mounting assembly 50 is configured to transmit the loads from the main rotor system 12 to the airframe 14. Positioned about the lower rotor shaft 40 of the main rotor system 12, adjacent the airframe 14 and gearbox 26, is a stationary cylindrical sleeve 42. The lower rotor shaft 40 is configured to rotate within the cylindrical sleeve 42. The mounting assembly 50 includes a plurality of generally bent or angled legs 52 such that a first end 54 of each leg 52 is arranged generally perpendicular to a second, opposite end 56 of each leg 52. The legs 52 are equidistantly spaced about the lower rotor shaft 40 and the first end 54 of each of the plurality of legs 52 is connected to the cylindrical sleeve 42, such as with a spline and cone connection or a fastener for example. In the mounted position, the first end 54 of each of the plurality of legs 52 is orientated substantially parallel to the axis of rotation A of the lower rotor shaft 40 and the second end 56 of each leg 52 is configured to couple, such as with a fastener (not shown) for example, to an adjacent surface of the airframe 14. As a result, the forces generated by the main rotor system 12 are transferred to the airframe 14 via the plurality of legs 52.

Integrally formed with each leg 52 is an L-shaped bracket 60 configured to support at least one servo 62, such as a hydraulic or electro-mechanical servo for example. Each L-shaped bracket includes a vertical member 64 and a base 66, the vertical member 64 being arranged generally parallel to the lower rotor shaft 40. In the illustrated, non-limiting embodiment, a front surface 68 of the vertical member 64 is integrally formed with a first side 58 of a corresponding leg 52 such that the base 66 extends through the opening 68 formed between the leg 52 and the airframe, towards the opposite side 59 of the leg 52. Such integral formation can be accomplished through casting processes, additive manufacturing techniques, or other mechanisms where the combination is created as a single piece of the same material. However, it is understood that the front surface 68 of the vertical member 64 can be connected to the first side 58 using fasteners, splines or other like mechanisms.

A first notch 72 is formed in a first side 70 of the vertical member 64 of the L-shaped bracket 60. The size and shape of the first notch 72 is generally complementary to the servo 62 configured to be received therein. A first end 74 of the servo 62 positioned within the first notch 72 is configured to engage a first stationary swashplate 76, such as a lower swashplate for example. Operation of the servo 62 located within the first notch 72 adjusts the pitch of at least one of the plurality of blades 20 of the upper or lower rotor system 16, 18 via the first swashplate 76. In one embodiment, illustrated in FIG. 3, a second notch 77, similar to or different from the first notch 72, is formed in a second, opposite side 75 of the vertical member 64 of the bracket 60. The second notch 77 is also configured to receive a servo 62. The servo 62 located within the second notch 77 may be substantially identical to or different from the servo 62 located within the first notch 72. In one embodiment, the servos 62 are fastened within the first and second notch 72, 77, such as with a bolt or other fastener for example. When a servo 62 is positioned in the second notch 77, a free end 78 of the servo 62 is configured to engage a second stationary swashplate (illustrated schematically at 80), such as an upper swashplate for example. The servo 62 located within the second notch 77 is similarly configured to adjust the pitch of at least one of the plurality of blades 20 of the other of the upper or lower rotor system 16, 18 via the second swashplate 80.

Figure 4:
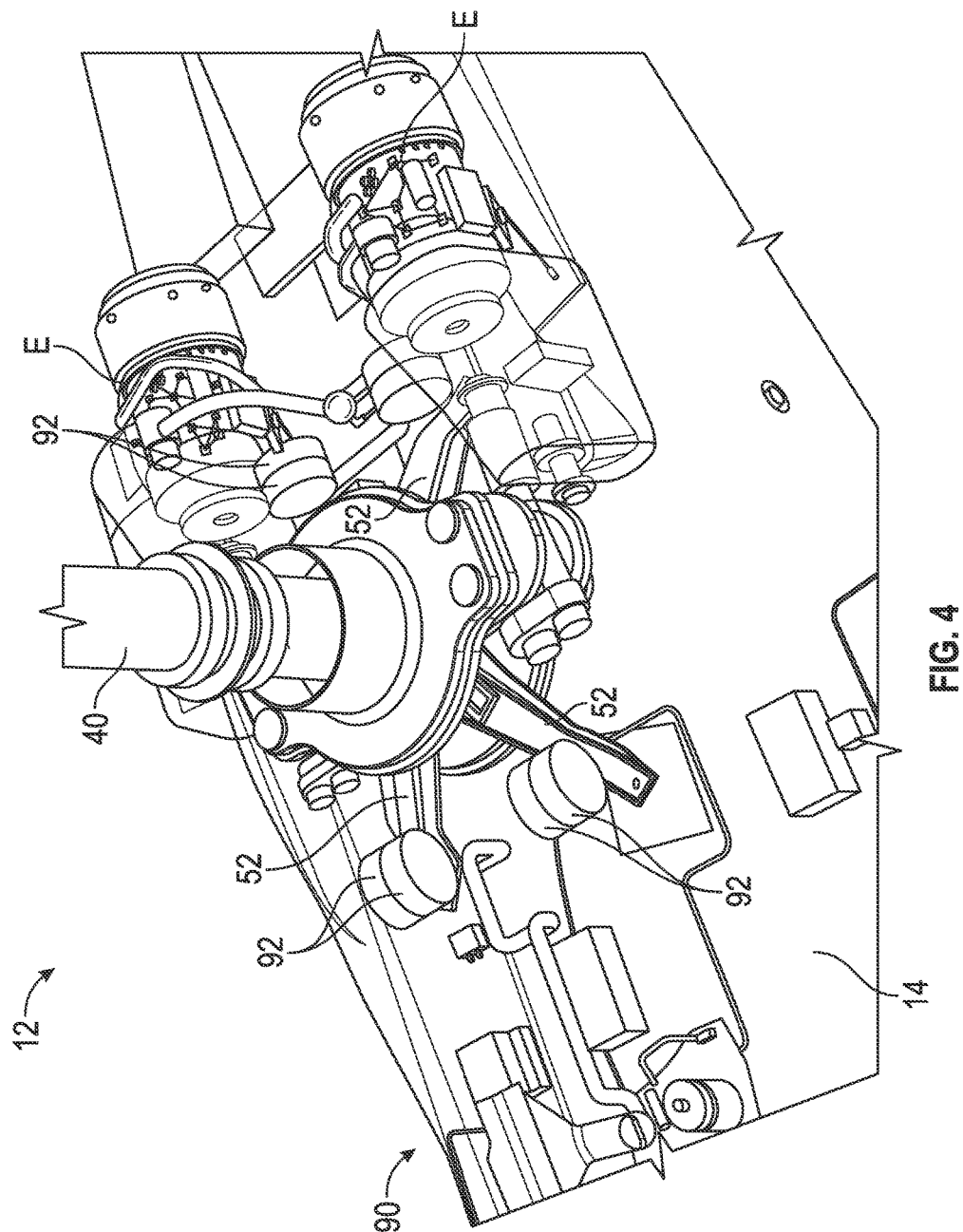
FIG. 4 is a top perspective view of the mounting assembly according to another embodiment of the invention.
Figure 5:
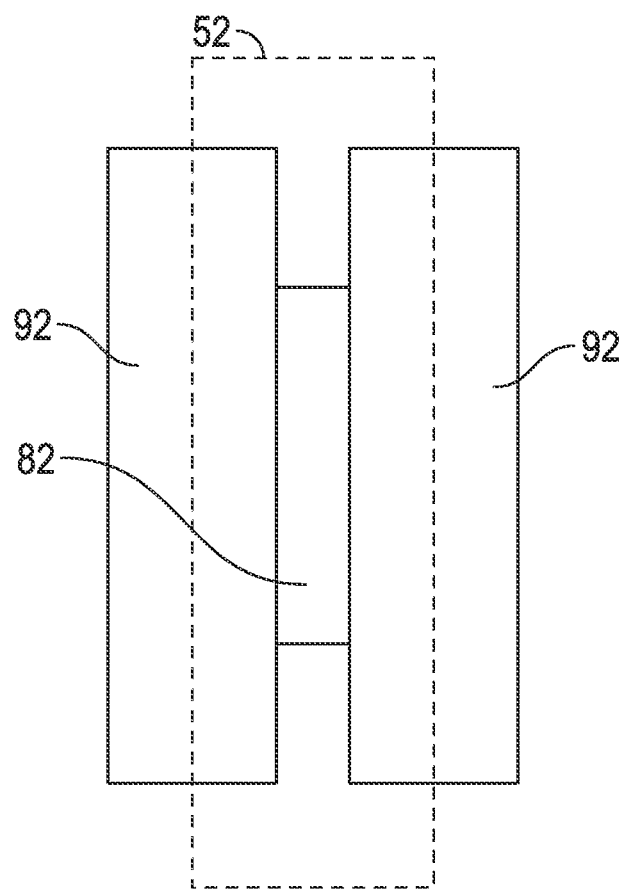
FIG. 5 is a top view of a portion of a leg of the mounting assembly according to an embodiment of the invention.

Referring now to FIGS. 4 and 5, in another embodiment, at least one of the plurality of legs 52 of the mounting assembly 50 is configured to support a portion of an active vibration control system 90 of the aircraft 10, such as one or more force generators 92 for example. The other components of the active vibration control system 90 are generally positioned near the legs 52 to minimize the weight of the system 90. A rib 82 is positioned near the second, outboard end 56 of one or more of the legs 52 and extends generally outwardly therefrom. As illustrated in FIG. 5, the rib 82 is received centrally between and coupled to a center opening formed in a force generator 92. The rib 82 may be integrally formed with the leg 52 and may extend generally parallel to the length of the leg 52, or may extend generally across the width of the leg 52.

In embodiments where a force generator 92 is mounted to each of a plurality of legs 52, at least one of the force generators 92 has a different orientation relative to the other force generators 92. In the illustrated, non-limiting embodiment, the force generators 92 mounted to the legs 52 forward of the main rotor system 12 (between the main rotor system 12 and a nose 13 of the airframe 14) have a first orientation, and the force generators 92 mounted to the legs 52 aft of the main rotor system 12 (between the main rotor system 12 and a tail 15 of the airframe 14) have a second orientation. The first orientation and the second orientation are arranged generally at an angle to one another, such as perpendicular for example, to distribute the various loads from the main rotor system 12. Having the force generators 92 disposed offset from the center of rotation A maximizes an effective moment arm to cancel vibratory roll, pitch and yaw moments and allows for smaller force generators 92 to be used. Further, placement of the force generators 92 on the legs 52 positions the force generators 92 on a primary load path of the vibratory load and upstream from. While shown without the bracket 60, it is understood that the force generators 92 could be mounted on legs 52 also having the bracket 60 in aspects of the invention.

By coupling a plurality of legs 52, each having an integrally formed L-shaped bracket 60, to the sleeve 42 of the lower rotor shaft 40 of the main rotor system 12, the forces generated by the first and second rotors 16, 18 are distributed through the mounting assembly 50 to the airframe 14. In addition, the legs 52 provide a location for mounting the servos 62 configured to provide pitch control of the blades 20 and a location for mounting the force generators of the active vibration control system 90. As a result, the overall weight and complexity of the aircraft 10 is reduced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A rotary wing aircraft comprising:
an airframe;
a main rotor system configured to rotate about a first axis of rotation;
a first stationary swashplate operably coupled to at least one first blade of the main rotor system; and
a mounting assembly for connecting the main rotor system to the airframe and holding a first servo which moves the first stationary swashplate, the mounting assembly comprising:
a leg having a first end attachable to the main rotor system and a second end attachable to the airframe, the leg being generally bent such that the first end of the leg is arranged at an angle to the second end of the leg so as to transmit forces between the main rotor system and the airframe; and
a bracket connected to a central portion of the leg, a portion of the bracket extending within an opening formed between the leg and the airframe, the bracket including a notch configured to receive the first servo, wherein when the first servo is positioned within the notch, a free end of the first servo is operably coupled to the first stationary swashplate and the leg reacts forces generated by the first servo into the main rotor system and the airframe; and
wherein operation of the first servo adjusts a pitch of the at least one first blade via the first stationary swashplate.

2. The rotary wing aircraft according to claim 1, wherein the main rotor system further comprises a cylindrical sleeve arranged about a rotating shaft.

3. The rotary wing aircraft according to claim 2, further comprising additional legs, wherein the leg and the additional legs are spaced equidistantly about the cylindrical sleeve.

4. The rotary wing aircraft according to claim 1, wherein the bracket further comprises a second notch configured to receive a second servo.

5. The rotary wing aircraft according to claim 4, wherein when the second servo is positioned within the second notch, a free end of the second servo is operably coupled to second stationary swashplate.

6. The rotary wing aircraft according to claim 1, further comprising a rib extending from the leg near the second end thereof, the rib being configured to connect to and support a portion of an active vibration control system.

7. The rotary wing aircraft according to claim 6, wherein the portion of the active vibration control system includes at least one force generator.

8. The rotary wing aircraft according to claim 6, wherein the rib is integrally formed with the leg.

9. The rotary wing aircraft according to claim 1, further comprising: a second stationary swashplate operably coupled to at least one second blade of the main rotor system, wherein the bracket further comprises a second notch configured to receive a second servo such that a free end of the second servo is operably coupled to the second stationary swashplate, and operation of the second servo adjusts a pitch of the at least one second blade via the second stationary swashplate.

10. The rotary wing aircraft according to claim 1, wherein a portion of an active vibration control system is mounted to the leg of the mounting assembly.

11. The rotary wing aircraft according to claim 10, wherein the portion of the active vibration control system includes at least one force generator mounted to the leg.

* * * * *